(No Model.)
E. T. SPOTTSWOOD.
SICKLE BAR FOR MOWING AND REAPING MACHINES.
No. 255,688. Patented Mar. 28, 1882.
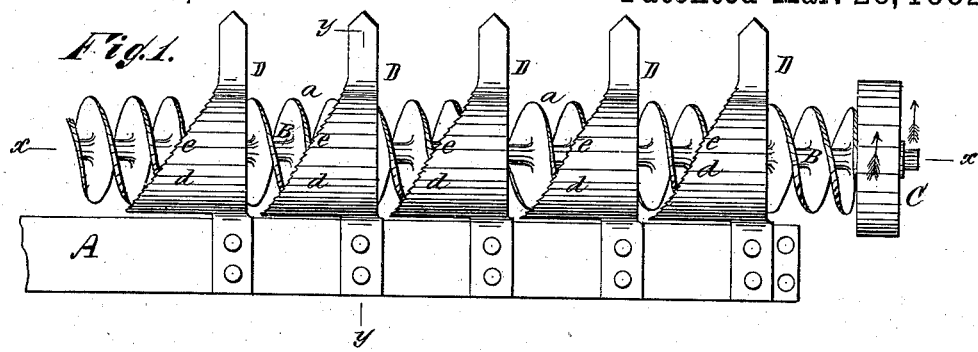
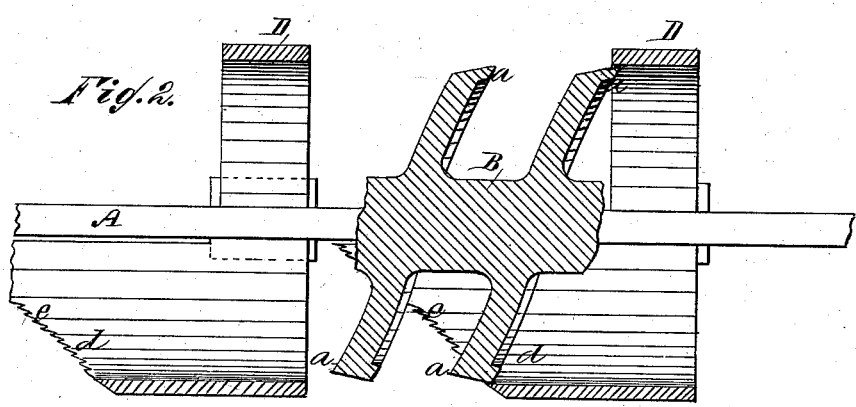
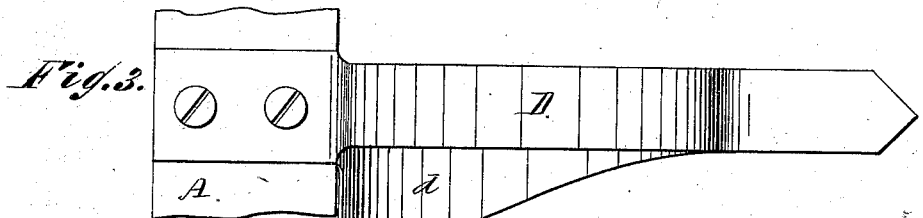
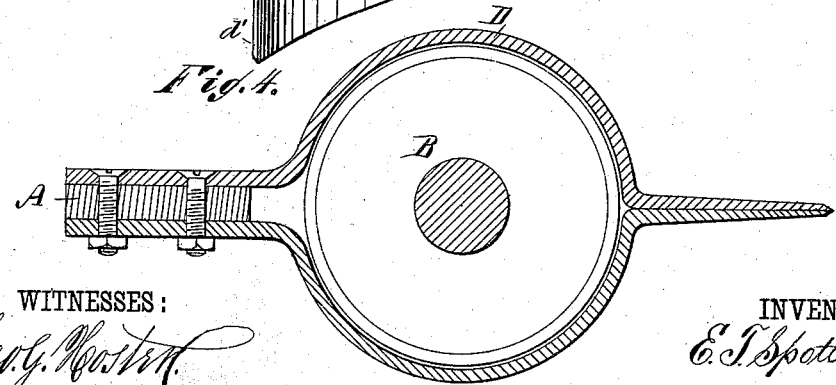
WITNESSES:
Theo. G. Hoster
C. Sedgwick
INVENTOR:
E. T. Spottswood
BY Munn & Co.
ATTORNEYS.
N. PETERS. Photo-Lithographer, Washington, D. C.

UNITED STATES PATENT OFFICE.

EDMUND T. SPOTTSWOOD, OF PERRYSVILLE, INDIANA.

SICKLE-BAR FOR MOWING AND REAPING MACHINES.

SPECIFICATION forming part of Letters Patent No. 255,688, dated March 23, 1882.

Application filed September 8, 1881. (No model.)

*To all whom it may concern:*

Be it known that I, EDMUND T. SPOTTSWOOD, of Perrysville, in the county of Vermillion and State of Indiana, have invented a new and useful Improvement in Sickle-Bars for Mowing and Reaping Machines, of which the following is a full, clear, and exact specification.

My invention consists of a revolving sickle-bar for mowing and reaping machines, and of the particular form, construction, and arrangement thereof, as hereinafter fully described.

Reference is to be had to the accompanying drawings, forming part of this specification, in which similar letters of reference indicate corresponding parts in all the figures.

Figure 1 is an elevation of the under side of my improved sickle-bar. Fig. 2 is a longitudinal section, taken on the line $x\ x$ of Fig. 1, of a portion of the sickle-bar. Fig. 3 is a detailed top view of one of the guards and its fixed cutting-edge; and Fig. 4 is a cross-section of the sickle-bar, taken on the line $y\ y$ of Fig. 1.

In the drawings, A represents the main bar, to which the guards D are bolted, and B represents the revolving cutter or sickle bar, which is formed with the spiral cutting-edges $a$. Each of the guards D is formed so as to surround or encircle the spiral sickle-bar B, and each of them is formed or provided with the diagonal fixed knives $d$, which are upwardly curved and reach from the forward edge of the main bar A up to the horizontal diameter of the revolving sickle-bar.

The fixed cutting-knives $d$ are beveled and made sharp along the diagonal cutting-edges thereof, as shown at $d'$ in Fig. 3; or they may be serrated in such manner that the teeth will stand downward and backward, as shown at $e$ in Figs. 1 and 2. The cutting edges or knives $a$ of the revolving sickle-bar are beveled and ground sharp like the blades of scissors, as clearly shown in Fig. 2.

Upon one end of the revolving cutting-bar is fixed the pulley C, over which a belt leading from a pulley on the main shaft of the machine passes to revolve the cutter in the direction indicated by the arrow in Fig. 1.

The form and arrangement of the spiral cutting-edges are such relative to each other and to the fixed cutting-edges that the spiral edges, as the sickle-bar revolves, travel across the fixed cutting-edges continuously or in such rapid succession as to cause all the grain to be cut as effectually as with the ordinary reciprocating section bar or sickle.

I am aware that rotary sickle-bars formed with spiral cutting-edges are not broadly new; and I am also aware that circular guards having serrated cutting-edges are not new; but

What I claim, and desire to secure by Letters Patent, is—

The combination, with the main bar A and the rotary sickle-bar B, provided with spiral cutting-edges, of the circular guards D, provided with the diagonal and upwardly-curved knives $d$, having downwardly and backwardly inclined teeth and extending from the forward edge of the said bar to the horizontal diameter of the revolving sickle-bar, substantially as and for the purpose set forth.

EDMUND TRAVERS SPOTTSWOOD.

Witnesses:
BENJ. I. POLAND,
GEORGE W. MCMURTRY.